No. 753,742. PATENTED MAR. 1, 1904.
L. A. SCIDMORE.
THILL OR TONGUE SUPPORT.
APPLICATION FILED NOV. 10, 1903.
NO MODEL.
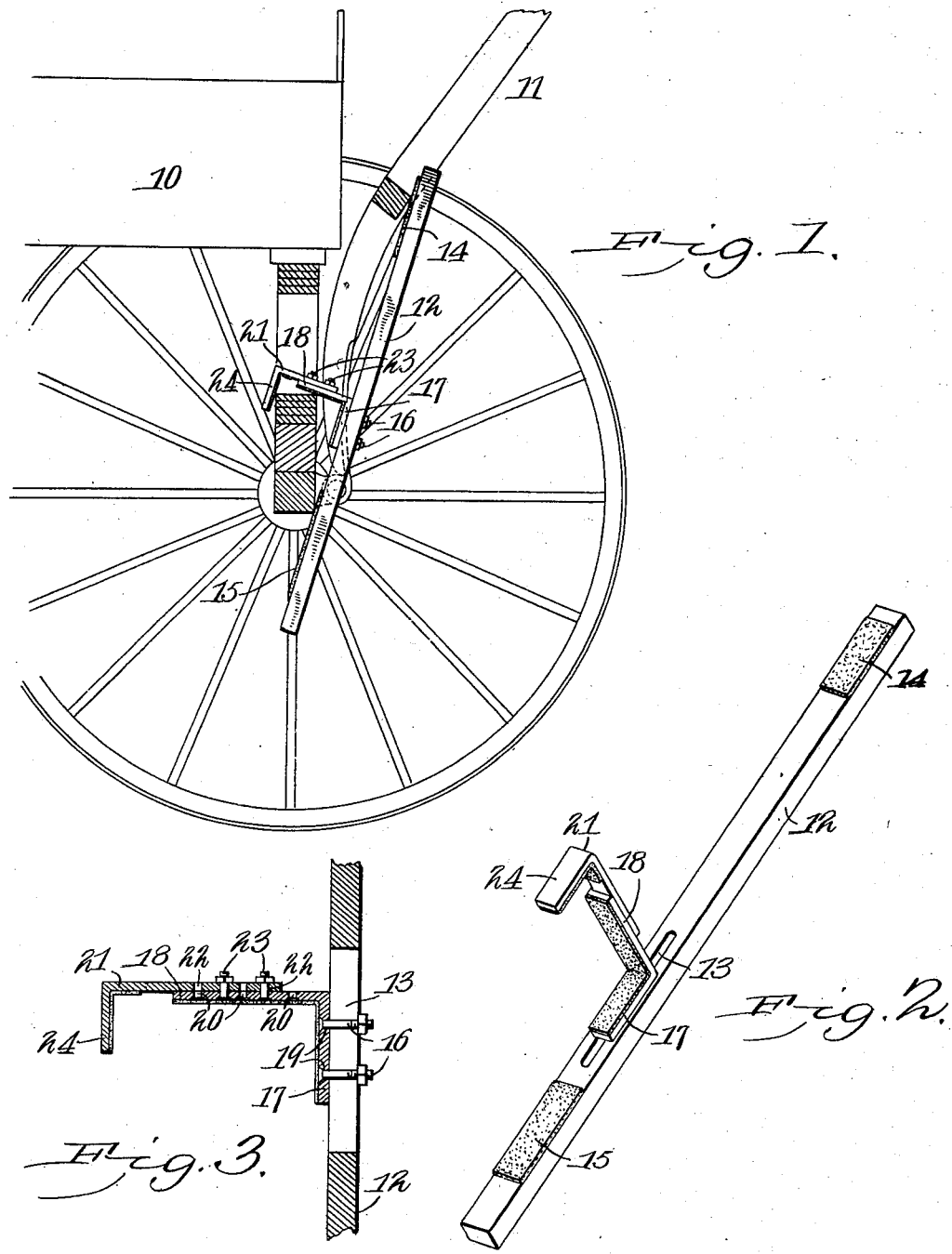
Witnesses
E. F. Stewart
C. N. Woodward
Louis A. Scidmore,
Inventor.
by C. A. Snow & Co
Attorneys No. 753,742. Patented March 1, 1904.

UNITED STATES PATENT OFFICE.

LOUIS A. SCIDMORE, OF EAU CLAIRE, WISCONSIN.

THILL OR TONGUE SUPPORT.

SPECIFICATION forming part of Letters Patent No. 753,742, dated March 1, 1904.

Application filed November 10, 1903. Serial No. 180,505. (No model.)

*To all whom it may concern:*

Be it known that I, LOUIS A. SCIDMORE, a citizen of the United States, residing at Eau Claire, in the county of Eau Claire and State of Wisconsin, have invented a new and useful Thill or Tongue Support, of which the following is a specification.

This invention relates to improvements in attachments for vehicles for temporarily supporting the thills or tongues in an elevated position when not in use, and has for its object to provide a simple and inexpensive device of this character which may be quickly adjusted to vehicles of different forms or construction and applicable to different parts of the vehicle; and to this end the invention consists in certain novel features of construction, as hereinafter shown and described, and specified in the claim.

In the drawings illustrative of the invention, in which corresponding parts are denoted by like designating characters, Figure 1 is a perspective view of a portion of the forward running-gear of a vehicle with the improvement applied. Fig. 2 is an enlarged perspective view of the device detached. Fig. 3 is a longitudinal section of the device, portions thereof being broken off.

The improved device may be applied to all the various forms and styles of buggies, carriages, and similar vehicles with either thills or tongues and transferable without change of structure from one to the other; but for the purpose of illustration the device is shown applied to an ordinary buggy, as at 10, having the usual thills 11.

The improved device consists of a bar 12, preferably of wood and provided with an intermediate longitudinal slot 13 and with spaced felt bearing-plates 14 15 to prevent abrasion of the parts of the vehicle with which the bar comes in contact.

Attached, as by clamp-bolts 16 extending through the slot 13, is a bracket comprising a base portion 17 and lateral portion 18, extending at right angles from the base portion, the two portions provided, respectively, with spaced clamp-bolt apertures 19 20. The plurality of the apertures 19 provide for lengthening the degree of the longitudinal extension of the base portion 17 relatively to the bar, as will be obvious.

Connected adjustably to the lateral portion 17 is an extension member 21, having spaced bolt-apertures 22, by which the extension may be connected adjustably to the portion 18 by clamp-bolts 23 engaging the apertures 20 and 22, as shown. The member 21 terminates in a hook 24, extending parallel to the bar 12 and spaced therefrom, as shown.

The inner face of the portion 18 and the member 21 and its hook 24 will preferably be lined with felt or similar material to prevent abrasion of the vehicle.

An implement thus constructed may be readily adjusted to fit any of the various forms and constructions of vehicles and may be applied between the forward springs and the thill or tongue bar, or between the spring-bar and thill or tongue, or between the body of the vehicle and the thill or tongue in some forms of vehicles by simply reversing the position of the bar and engaging the hooked bracket with the body of the vehicle above the thill or tongue bar; but as these various methods of using the device will readily suggest themselves to the user when applying it to various forms of vehicles it is not deemed necessary to illustrate the application further.

The bar 12 will preferably be of wood and the bracket and its attachments of metal of sufficient strength to withstand the strains to which they will be subjected.

Having thus described the invention, what I claim is—

A thill or tongue support, comprising a bar having an intermediately-disposed longitudinal slot, a bracket formed with a base portion and right-angled lateral portion, each of said portions having spaced bolt-apertures, said base portion for adjustable engagement with said bar by a clamp-bolt engaging said slot and bracket-apertures, and an extension-arm having spaced bolt-apertures for adjustable connection with said lateral bracket portion by a clamp-bolt engaging said apertures and terminating in a hook extending parallel to said bar.

In testimony that I claim the foregoing as my own I have hereto affixed my signature in the presence of two witnesses.

LOUIS A. $\overset{\text{his}}{\times}$ SCIDMORE.
mark

Witnesses:
J. B. FLEMING,
W. W. COWAN.